United States Patent [19]

Campbell et al.

[11] Patent Number: 4,645,611

[45] Date of Patent: Feb. 24, 1987

[54] DISPERSION

[75] Inventors: Frederick Campbell, Manchester; Peter K. Davies, Oldham; John D. Schofield, Bury, all of England

[73] Assignee: Imperial Chemical Industries Plc, London, England

[21] Appl. No.: 697,570

[22] Filed: Feb. 1, 1985

[30] Foreign Application Priority Data

Feb. 2, 1984 [GB] United Kingdom ............... 8402801

[51] Int. Cl.$^4$ ........................ H01F 1/02; B01F 17/52
[52] U.S. Cl. ............................ 252/62.51; 252/62.53; 252/62.54; 252/356; 252/357; 524/190; 525/417; 525/437; 528/332; 528/361
[58] Field of Search ............... 252/62.54, 62.51, 62.53, 252/356, 357; 528/332, 361; 524/190; 525/417, 437

[56] References Cited

U.S. PATENT DOCUMENTS

| | | | |
|---|---|---|---|
| 3,778,287 | 12/1973 | Stansfield et al. | 106/308 Q |
| 4,153,754 | 5/1979 | Huisman | 252/62.53 |
| 4,224,212 | 9/1980 | Topham | 260/33.6 R |
| 4,398,955 | 8/1983 | Stansfield | 106/23 |
| 4,518,435 | 5/1985 | Stansfield et al. | 106/308 N |

OTHER PUBLICATIONS

D-1, "The Wetting of Magnetic Pigment", given at a symposium in Hawaii in May 1983 by Lawrence B. Lueck, President, Magnetic Media Information Services, Tokyo, Japan.

Primary Examiner—Arthur P. Demers
Attorney, Agent, or Firm—Cushman, Darby & Cushman

[57] ABSTRACT

A dispersion of finely divided particles of a magnetic material in an organic liquid containing a dispersant comprising an amine carrying a poly(carbonylalkyleneoxy) chain (PCAO chain) in which the alkylene groups contain up to 8 carbon atoms, or an acid-salt thereof. The dispersion is useful for the preparation of magnetic recording media such as video, audio and computer recording tapes and discs. Certain of the dispersants are novel, especially a polyethyleneimine carrying at least two PCAO chains.

10 Claims, No Drawings

DISPERSION

This specification describes an invention relating to a novel dispersion of finely divided magnetic particles, to a novel dispersant, and to magnetic recording media made from the dispersion.

Magnetic recording media, such as video, computer and audio tapes and discs, generally comprise a non-ferromagnetic substrate, e.g. a polymeric material or a metal, carrying a superficial layer of magnetic particles contained in, and/or bound to, the substrate by a film-forming resin. Such recording media are generally prepared by forming a dispersion of the magnetic particles in a solvent/resin system, applying the dispersion to the substrate and evaporating the solvent to leave a layer of resin and magnetic particles on the surface of the substrate. Before, or during, the drying operation the magnetic particles may be orientated by passing the substrate through a magnetic field. In order to improve the quality of the dispersion a dispersing aid, e.g. lecithin, a phosphate ester of an alkyl phenoxyethoxylate, a sulphosuccinate or a fatty acid salt, is frequently added during the preparation of the dispersion. It has now been found that the magnetic properties of the recording medium, such as the "magnetic squareness", the "orientation ratio", the "remanent magnetic induction", the "switching field distribution" and/or the "coercivity" can be improved by the incorporation of a new dispersant. To take advantage of the improved dispersion quality, parameters of the dispersion system, such as concentration of dispersant and magnetic material and milling conditions, may have to be adjusted depending on the nature of the magnetic material.

According to the present invention there is provided a dispersion of finely divided particles of a magnetic material in an organic liquid containing a dispersant comprising an amine carrying a poly(carbonylalkyleneoxy) chain in which the alkylene groups contain up to 8 carbon atoms, or an acid salt thereof.

The magnetic material may be any such material used for the preparation of magnetic recording media, for example, the magnetic oxides of transition metals such as iron and chromium, especially gamma-$Fe_2O_3$, $Fe_3O_4$, cobalt-doped iron oxides, $CrO_2$, ferrites, especially barium ferrites, and metal particles, especially metallic iron, nickel, cobalt and alloys thereof. By the term finely divided is meant that the particles are below 5 microns and more preferably below 1 micron. Magnetic particles are generally anisotropic and the above dimensions refer to the length of the particles in their longest dimension.

The organic liquid is preferably a solvent for the resin which provides a protective film around the magnetic particles on the substrate and bind the particles to the substrate. Resins suitable for this purpose are polyurethanes, vinylacetate/vinylchloride copolymers and their derivations, polyesters, epoxy resins, phenoxy resins, cellulose nitrates, polyvinylidenedichloride/acrylonitrile copolymers, butadiene/styrene copolymers, butadiene/acrylonitrile copolymers, polyisocyanates and alkyd resins.

Such resins are generally soluble in polar organic liquids such as ketones, esters, ethers and amides and these are preferred organics liquids for the present dispersions. Specific examples of such liquids are methylethylketone, cyclohexanone, methylisobutylketone, tetrahydrofuran, the acetates and alkyl ethers of ethylene glycol and the $C_{1-4}$-alkylethers. Other less polar organic liquids, such as toluene and xylene, may be employed either in admixture with the abovementioned more polar solvents or alone, provided the resin is soluble therein.

The amine preferably conforms to the general formula:

$$X-Y-Z \qquad \text{I}$$

wherein
X is the poly(carbonylalkyleneoxy) chain;
Y is a bridging group; and
Z is an organic radical containing an amino group.

The alkylene groups in the poly(carbonylalkyleneoxy) chain, hereinafter referred to as "the PCAO chain", preferably contain from 3 to 6 carbon atoms, an especially preferred alkylene group being pentamethylene wherein the chain is a poly(6-hydroxycaproic) acid chain derivable from E-caprolactone. The PCAO chain may contain a mixture of alkylene groups of different length but is preferably a homopolymer. The PCAO chain may carry a chain-stopping terminal group at the free end, such as optionally substituted alkyl, e.g. alkyl, alkoxyalkyl or haloalkyl, where the substituent prevents further growth of the PCAO chain. Where the dispersant is formed by the polymerisation of a carbonylalkyleneoxy monomer in the presence of an amine, the presence of a chain stopper is not necessary and the PCAO chain may be terminated by a hydroxy group. The PCAO chain preferably contains from 3 to 80 carbonylalkyleneoxy units.

The bridging group linking the PCAO chain to the amine is preferably an ester group, —CO—O—, but more preferably an amide group, —CO—NR—, wherein R is H or $C_{1-20}$alkyl, especially $C_{1-4}$-alkyl, or a salt comprising two counter-ions attached to the amine and the PCAO chain, respectively, i.e. —CO—O⁻ ⁺N-T₃—, in which T is H or an organic radical. The dispersant may contain more than one PCAO chain or may comprise a mixture of compounds, in which case it may contain a mixture of amide and salt links. The organic radical, T, may be aliphatic, alicyclic or aromatic or two of the groups, T, together with the nitrogen atom may form a heteroalicycle. Examples of organic radicals represented by T are methyl, ethyl, lauryl, stearyl, phenyl, benzyl, or two T-groups may form a pentamethylene, an ethyleneoxyethylene or an ethyleneaminoethylene group.

The organic group, Z, is preferably of the general formula:

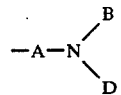

wherein
A is alkylene;
B is H, or optionally substituted alkyl; and
D is optionally substituted alkyl.

Where A, B or D represent or contain an alkylene group this is preferably a $C_{1-4}$-alkylene group and where B or D is alkyl this may contain up to 20 carbon atoms which may be substituted by hydroxy, amino, halogen or alkoxy groups. Examples of the optionally substituted alkyl radicals represented by B and D are alkyl, such as ethyl, methyl, lauryl and octadecyl, aminoalkyl, such as aminoethyl and aminoethylaminoethyl, hydroxyalkyl, such as hydroxyethyl, hydroxyalkylaminoalkyl, such as hydroxyethylaminoethyl, aminoalkoxyalkyl, such as aminoethoxyethyl, and poly(alkyleneimine). Where B and/or D represent poly(alkyleneimine) this is preferably poly(ethyleneimine) having a weight-average molecular weight up to 600,000 and may be branched or straight-chained.

The dispersant is derivable from an amide carrying an appropriate reactive group and a poly(carbonylalkyleneoxy) acid or a precurser thereof, such as a lactone. Where the bridging group is an ester, the dispersant may be derived from an amine carrying an hydroxy group and a PCAO acid, wherein reaction between the hydroxy group on the amine and a terminal carbonyl group on the PCAO acid forms the ester linking group. Where the bridging group is an amide or a salt group, the dispersant may be derived from a polyamine, having at least one primary or secondary amino group, and a PCAO acid wherein reaction between a p- or s-amino group in the polyamine and a terminal carbonyl group on the PCAO acid forms the amide or salt group. The dispersant is derivable from a wide range of amines from simple polyamines, such as dimethylaminopropylamine (DMAPA), diethylaminopropylamine (DEAPA), diethylenetriamine (DETA), triethylenetetramine (TETA), 3-dodecylamino- and 3-tetradecylamino-propylamine and 3-octadecylamino-propylamine (ODAPA), and aminoalcohols, such as diethylaminoethanol (DEAE), dimethylaminoethanol (DMAE) and triethanolamine (TEA), up to a large polymeric amine, such as poly(alkyleneimine), e.g. poly(ethyleneimine) having a weight-average molecular weight up to 600,000. Where the amine contains two or more hydroxy and/or amino groups capable of forming ester, amide or salt groups, the dispersant may carry more than one PCAO chain, each being attached to the polyamine by an ester, amide or salt bridging group.

A preferred dispersant comprises a polyethyleneimine carrying at least two PCAO chains linked thereto by amide and/or salt bridging groups. The polyethyleneimine may be straight-chained but is preferably branch-chained and, more preferably, with at least 10% of the nitrogen atoms being present in tertiary-amino groups.

The acid-salt form of the dispersant may be formed by reaction of the free amine form with an acid or by quaternisation of the amino group or groups to form a substituted ammonium ion or ions. Suitable reagents for this purpose are mineral and strong organic acids or acidic salts, such as acetic acid, sulphuric acid, hydrochloric acid, alkylsulphonic acids, arylsulphonic acids and alkyl hydrogen sulphates and quaternising agents such as dimethyl sulphate (DMS), methyl and ethyl halides and diethyl sulphate (DES).

The dispersion preferably contains from 30% to 90% by weight of the magnetic material, based on the total weight of the dispersion and preferably from 0.25% to 10%, by weight, of the dispersant, based on the weight of the magnetic material. Where the dispersion also contains a film-forming resin this is preferably present in an amount from 0% to 20%, by weight, based upon the total weight of the dispersion.

The dispersion may be prepared by mixing the magnetic material and the dispersant into the organic liquid, optionally with a suitable resin, and subjecting the mixture to a grinding operation to de-agglomerate the particles of the magnetic material and/or reduce the particles of the magnetic material to the appropriate size. In order to maintain maximum anisotropy the grinding operation is continued for the minimum period of time required to reduce the particles or agglomerates thereof to the appropriate size. Suitable apparatus for the grinding operation is a ball or bead mill.

The present dispersion, when mixed with a film-forming resin, is particularly useful for application to an appropriate substrate, such a polyester tape or disc or an aluminium disc, to form a magnetic recording medium. The dispersion containing the resin may be applied to a tape or disc by a suitable coating technique and the organic liquid removed, by evaporation, to leave a film of the resin containing the magnetic particles evenly dispersed therein. The particles may be permanently oriented within the resin film by passing the tape or disc through a magnetic field immediately before or during evaporation of the organic liquid.

According to a further feature of the present invention there is provided a magnetic recording medium comprising a substrate carrying a superficial layer of a film-forming resin containing dispersed therein finely-divided particles of a magnetic material and a dispersant carrying a PCAO chain as hereinbefore defined.

Certain of the dispersants disclosed herein are novel compounds and according to a further feature of the present invention there is provided a dispersant comprising a poly(ethyleneimine) carrying at least two poly(carbonylalkyleneoxy) chains attached thereto by amide or a salt bridging groups in which the alkylene groups contain from 3 to 6 carbon atoms. It is preferred that the alkylene groups are all pentamethylene and that the PCAO chain contains from 3 to 80 carbonylalkyleneoxy units.

This dispersant may be prepared by reaction of a poly(ethyleneimine) with a PCAO acid or precurser thereof, such as a lactone or hydroxycarboxylic acid at a temperature from 25° C. to 250° C. for up to 24 hours. Under mild conditions (low temperature and/or short reaction time) salt bridging groups are formed and under more severe conditions (higher temperature and/or longer reaction time) amide or a mixture of amide and salt bridging groups are formed.

According to a further feature of the present invention there is provided an acid-salt of an amine carrying a poly(carbonylalkyleneoxy) chain attached thereto by an ester, amide or salt bridging group in which the alkylene groups contain from 3 to 6 carbon atoms. It is preferred that the alkylene groups are all pentamethylene and that the PCAO chain contains from 3 to 80 carbonylalkyleneoxy units.

This dispersant may be prepared by reaction of an amine carrying an hydroxy group, or a polyamine having at least one primary or secondary amino group, with a PCAO acid, or a precurser thereof such as a lactone or hydroxycarboxylic acid, at a temperature from 25° C. to 250° C. for up to 24 hours, and forming an acid-salt of the amine by reaction with an an acid or a quaternising agent.

The PCAO acid may be prepared by heating a hydroxycarboxylic acid or lactone with a carboxylic acid which is free from hydroxy groups, such as acetic acid, caproic acid, lauric acid and methoxyacetic acid. Polymerisation is conveniently performed at a temperature from 100° C. to 250° C., preferably from 130° C. to 200° C., in the presence of an esterification catalyst, such as tetrabutyl titanate, zirconium naphthenate, zinc acetate or toluenesulphonic acid.

To minimise degradation of the reactants and products the reactions are preferably performed under an inert atmosphere, such as nitrogen.

The invention is further illustrated by the following examples in which all parts and percentages are by weight unless otherwise indicated.

Dispersant 1

A mixture of 111 g of E-caprolactone, 8.1 g of DMAPA and 0.1 g of tetrabutyltitanate was stirred under nitrogen for 1½ hours at 175° C. to 185° C. The product was a hard wax of equivalent 1604.

Dispersant 2

A mixture of 230 g of E-caprolactone, 8.1 g of DMAPA and 0.1 g of tetrabutyltitanate was stirred under nitrogen for 24 hours at 175° C. to 185° C. The product was a hard wax of equivalent 3108.

Dispersant 3

A mixture of 175 g of E-caprolactone, 4.05 g of DMAPA and 0.1 g of tetrabutyltitanate was stirred under nitrogen for 12 hours at 210° C. The product was a hard wax of equivalent 4596.

Dispersant 4

A mixture of 150.6 g of E-caprolactone, 8.1 g of DMAPA and 0.1 g of tetrabutyltitanate was stirred under nitrogen for 1½ hours at 160° C. to 165° C. The product was a hard wax of equivalent 2050.

Dispersant 5

A mixture of 150 g of E-caprolactone, 32.4 g of DMAPA and 0.1 g of tetrabutyltitanate was stirred under nitrogen for 7 hours at 170° C. to 190° C. The product was a soft wax of equivalent 640.

Dispersant 6

A mixture of 100 g of Intermediate 3 and 10 g of triethylene tetramine was stirred under nitrogen for ½ hour at 80° C. The product was a soft wax of equivalent 708.

Dispersant 7

A mixture of 100 g of Intermediate 3 and 20 g of DUOMEEN C, a blend of alkyl diamines, predominantly 3-dodecylaminopropylamine and 3-tetradecylaminopropylamine, (DUOMEEN is a trade mark of AKZO Chemie) was stirred under nitrogen for ½ hour at 80° C. The product was a soft wax of equivalent 1075.

Dispersant 8

A mixture of 66.8 g of E-caprolactone, 8.85 g of diethylethanolamine and 0.1 g of tetrabutyltitanate was stirred under nitrogen for 1½ hours at 160° C. to 165° C. The product was a hard wax of equivalent 1680.

Dispersant 9

A mixture of 102.5 g of E-caprolactone, 10 g of dimethylaminoethanol and 0.1 g of tetrabutyl titanate was stirred under nitrogen for 2 hours at 160° C. to 165° C. The product was a hard wax of equivalent 1200.

Intermediate 1

A mixture of 112 g of E-caprolactone, 9.2 g of n-caproic acid and 0.1 g of tetrabutyltitanate was stirred under nitrogen for 18 hours at 180° C. to 190° C. The product was a hard wax with an acid value of 36 mg KOH/g.

Intermediate 2

A mixture of 582 g of E-caprolactone, 32.25 g of methoxyacetic acid and 0.5 g of tetrabutyltitanate was stirred under nitrogen for 20 hours at 170° C. to 180° C. The product was a hard wax with an acid value of 35.2 mg KOH/g.

Intermediate 3

A mixture of 500 g of E-caprolactone, 73 g of lauric acid and 0.5 g of tetrabutyltitanate was stirred under nitrogen for 20 hours at 170° C. to 180° C. The product was a hard wax with an acid value of 36.35 mg KOH/g.

Intermediate 4

A mixture of 250 g of E-caprolactone, 88 g of lauric acid and 0.2 g of tetrabutyltitanate was stirred under nitrogen for 8 hours at 160° C. to 180° C. The product was a wax with an acid value of 75.7 mg.KOH/g.

Intermediate 5

A mixture of 485 g of E-caprolactone, 34 g of lauric acid and 0.1 g of tetrabutyltitanate was stirred under nitrogen for 19 hours at 170° C. to 190° C. The product was a hard wax with an acid value of 18.6 mg.KOH/g.

Intermediate 6

A mixture of 485 g of E-caprolactone, 22.4 g of lauric acid and 0.1 g of tetrabutyltitanate was stirred under nitrogen for 19 hours at 170° C. to 190° C. The product was a hard wax with an acid value of 12.4 mg.KOH/g.

Intermediate 7

A mixture of 500 g of E-caprolactone, 17 g of lauric acid and 0.1 g of tetrabutyltitanate was stirred under nitrogen for 19 hours at 180° C. to 200° C. The product was a hard wax.

EXAMPLE 1

To 46.6 g of Dispersant 4 stirring above its melting point (approximately 65° C.) was added 2.7 g of dimethylsulphate causing the temperature to rise by approximately 15° C. The mixture was then stirred for 1½ hours at 90° C. to 100° C. and cooled to ambient. The product was a hard wax, hereinafter called Dispersant 9a.

EXAMPLE 2

A mixture of 32.5 g of Intermediate 1 and 1.25 g of a dry polyethylenimine having a weight-average molecular weight in the region of 100,000, available from BASF under the name "POLYMIN Waterfree" (POLYMIN is a trade mark), was stirred under nitrogen for 8 hours at 120° C. The product was a wax of equivalent 3175, hereinafter called Dispersant 10.

EXAMPLE 3

This was prepared in a similar manner to Example 2, but using 40 g of Intermediate 1 and 3.33 g of "POLYMIN Waterfree". The product was a wax of equivalent 1510, hereinafter called Dispersant 11.

EXAMPLE 4

This was prepared in a similar manner to Example 2, but using 40 g of Intermediate 1 and 13.3 g of "POLYMIN Waterfree". The product was a sticky wax of equivalent 475, hereinafter called Dispersant 12.

EXAMPLE 5

A mixture of 10.8 g of the product of Example 2 and 10.8 g of tetrahydrofuran was stirred and heated until a clear solution was obtained. The solution was cooled to 35° C. and 0.405 g of dimethyl sulphate was added. The mixture was then stirred for a further hour at 65°–70° C. The tetrahydrofuran was then removed from the mixture by distillation, giving the product hereinafter called Dispersant 13.

EXAMPLE 6

This was prepared in a similar manner to Example 5, but using 10.24 g of the product of Example 3, 10.24 g of tetrahydrofuran and 0.81 g of dimethyl sulphate. The product is hereinafter called Dispersant 14.

EXAMPLE 7

A mixture of 16.1 g of the product of Example 4 and 16.1 g of tetrahydrofuran was stirred and heated. A solution was obtained, but it was not completely clear. The solution was cooled to 40° C., and 4.05 g of dimethyl sulphate was added slowly. There was a vigorous exotherm. The mixture was then stirred for a further hour at 65°-70° C. The tetrahydrofuran was then removed from the mixture by distillation, giving the product hereinafter called Dispersant 15.

EXAMPLE 8

This was prepared in a similar manner to Example 2, but using 95.7 g of Intermediate 2 and 7.36 g of "POLYMIN Waterfree". The product is hereinafter called Dispersant 16.

EXAMPLE 9

This was prepared in a similar manner to Example 2, but using 97.3 g of Intermediate 3 and 7.48 g of "POLYMIN Waterfree". The product is hereinafter called Dispersant 17.

EXAMPLES 10 TO 17

Table 1 lists a series of preparations carried out in a similar manner and at a similar temperature to Example 2, but using the starting materials, the weights thereof and the reaction times shown in the table.

TABLE 1

| Example No | Polyester component Intermediate No | Weight of Polyester component (g) | Weight of "Polymin Waterfree" used (g) | Reaction time (hours) | Product name Dispersant No |
|---|---|---|---|---|---|
| 10 | 4 | 140 | 20 | 8 | 18 |
| 11 | 3 | 90 | 30 | 18 | 19 |
| 12 | 5 | 90 | 30 | 18 | 20 |
| 13 | 5 | 143 | 11 | 15 | 21 |
| 14 | 6 | 90 | 30 | 18 | 22 |
| 15 | 6 | 143 | 11 | 15 | 23 |
| 16 | 7 | 90 | 30 | 18 | 24 |
| 17 | 7 | 138 | 10.6 | 17 | 25 |

EXAMPLE 18

65 g of Dispersant 16 was stirred above its melting point (approximately 60° C.) and 4.05 g dimethyl sulphate added, causing the temperature to rise by approximately 15° C. The mixture was then stirred for 1½ hours at 85° C. to 95° C. The product is hereinafter called Dispersant 26.

EXAMPLE 19

This was prepared in a similar manner to Example 18, but using 68 g of Dispersant 17 and 4.05 g of dimethyl sulphate. The product is hereinafter called Dispersant 27.

EXAMPLE 20

37.6 g of Dispersant 8 was stirred above its melting point (approximately 45° C.) and 2.7 g dimethyl sulphate added, causing the temperature to rise by approximately 15° C. The mixture was then stirred for 2 hours at 85° C. to 95° C. The product is hereinafter called Dispersant 28.

EXAMPLE 21

A mixture of 100 g of Intermediate 3 and 7.69 g of polyethyleneimine, having a number average molecular weight of approximately 600, sold by the Dow Chemical Company under the name "MONTREK 6" (MONTREK is a trade mark), was stirred under nitrogen for 8 hours at 110° C. to 130° C. The product was a hard wax, and is hereinafter called Dispersant 29.

EXAMPLES 22 TO 24

Table 2 lists a series of preparations carried out in a similar manner and at a similar temperature to Example 1, but using the starting materials and the weights thereof shown in the table.

TABLE 2

| Example No. | Polyester component Dispersant No | Weight of Polyester component (g) | Weight of dimethyl sulphate used (g) | Product name Dispersant No |
|---|---|---|---|---|
| 22 | 5 | 73 | 13.5 | 30 |
| 23 | 2 | 70.2 | 2.7 | 31 |
| 24 | 3 | 69 | 1.75 | 32 |

EXAMPLE 25

27.3 g of Dispersant 9 was stirred above its melting point (approx 50° C.) and 2.7 g of dimethyl sulphate added, causing the temperature to rise by approximately 15° C. The mixture was then stirred for 2 hours at 85° C. to 95° C. The product is hereinafter called Dispersant 33.

EXAMPLES 26 TO 60 AND COMPARATIVE EXAMPLES (CE) 1 TO 9

Mixtures of magnetic material, dispersant, resin and solvent(s), as indicated in Table 3, were premixed using a high-speed stirrer and then subjected to a high energy ball-milling for the time shown in Table 3. Dispersions suitable for use in the manufacture of magnetic media were obtained in this way.

Examples 26 to 60 were made with Dispersants 1 to 33; Comparative Examples (CE) were made with Lecithin and GAFAC RE 610.

The magnetic materials used were as follows:

Type A A gamma-$Fe_2O_3$ with a surface area of 18.5 $m^2$/g, an oil absorption of 41 ml/100 g and a particle length of 0.4 microns. This is typical of magnetic iron oxides used in audio tapes.

Type B A cobalt-doped gamma-$Fe_2O_3$ with a surface area of 23 $m^2$/g, an oil absorption of 41 g/100 g and a particle length of 0.35 microns. This material which was supplied by Bayer UK Ltd. under the product name BAYFERROX AC 5120M (BAYFERROX is a trade mark) is typical of magnetic iron oxides used in high-bias audio tapes and in video cassette tapes.

Type C A stabilised magnetite with a surface area of 19 $m^2$/g, an oil absorption of 40 g/100 g, and a particle length of 0.45 microns. This material was supplied by Bayer UK Ltd., under the product name BAYFERROX AC 5110M.

Type D A chromium dioxide magnetic material of the type used in computer tapes and video cassette tapes.

Type E 99.99% pure Nickel supplied by the Aldrich Chemical Co Inc.

The resin was a hydroxylated vinyl chloride/vinyl acetate copolymer obtained from Union Carbide under the trade mark UCAR VAGH.

In the following tables the following abbreviations are used

THF is tetrahydrofuran.
MEK is methyl ethylketone.
EOEA is 2-ethoxyoxyethyl acetate.
MIBK is methyl iso-butyl ketone.
BA is butyl acetate.
BOEA is 2-butoxyethylacetate.
EA is ethyl acetate.
CH is cyclohexanone
Tol is toluene GAFAC RE-610 is a phosphated alkylphenol-ethoxylate supplied by the GAF Corporation (GAFAC is a trade mark).

TABLE 3

| Example or CE Number | Magnetic material & Amount (g) | Dispersant and Amount (g) | Solvent(s) and Amount (g) | | Amount of resin (g) | High energy milling time (minutes) |
|---|---|---|---|---|---|---|
| 26 | Type A 80.4 | Disp. 1 3.22 | THF MEK | 36.98 36.98 | 2.41 | 30 |
| CE 1 | Type A 80.4 | Lecithin 3.22 | THF MEK | 36.98 36.98 | 2.41 | 30 |
| 27 | Type A 80.0 | Disp. 2 3.2 | THF MEK | 37.2 37.2 | 2.41 | 60 |
| CE 2 | Type A 80.0 | Lecithin 3.2 | THF MEK | 37.2 37.2 | 2.41 | 60 |
| CE 3 | Type A 80.0 | GAFAC 3.2 | THF MEK | 37.2 37.2 | 2.41 | 60 |
| CE 4 | Type B 20.0 | Lecithin 0.8 | THF MEK | 9.2 9.2 | 0.76 | 60 |
| 28 | Type B 20.0 | Disp. 17 0.8 | THF MEK | 9.2 9.2 | 0.76 | 60 |
| CE 5 | Type B 20.0 | GAFAC 0.8 | THF MEK | 9.2 9.2 | 0.76 | 60 |
| 29 | Type B 20.0 | Disp. 18 0.8 | THF MEK | 9.2 9.2 | 0.76 | 60 |
| 30 | Type B 20.0 | Disp. 21 0.8 | THF MEK | 9.2 9.2 | 0.76 | 60 |
| 31 | Type B 20.0 | Disp. 23 0.8 | THF MEK | 9.2 9.2 | 0.76 | 60 |
| 32 | Type B 20.0 | Disp. 25 0.8 | THF MEK | 9.2 9.2 | 0.76 | 60 |
| 33 | Type B 20.0 | Disp. 19 0.8 | THF MEK | 9.2 9.2 | 0.76 | 60 |
| 34 | Type B 20.0 | Disp. 20 0.8 | THF MEK | 9.2 9.2 | 0.76 | 60 |
| 35 | Type B 20.0 | Disp. 11 0.8 | THF MEK | 9.2 9.2 | 0.76 | 60 |
| 36 | Type B 20.0 | Disp. 13 0.8 | THF MEK | 9.2 9.2 | 0.76 | 60 |
| 37 | Type B 20.0 | Disp. 16 0.8 | THF MEK | 9.2 9.2 | 0.76 | 60 |
| 38 | Type B 20.0 | Disp. 29 0.8 | THF MEK | 9.2 9.2 | 0.76 | 60 |
| 39 | Type B 20.0 | Disp. 6 0.8 | THF MEK | 9.2 9.2 | 0.76 | 60 |
| 40 | Type B 20.0 | Disp. 7 0.8 | THF MEK | 9.2 9.2 | 0.76 | 60 |
| 41 | Type B 16.0 | Disp. 17 0.64 | THF MEK | 11.3 11.3 | 0.76 | 60 |
| 42 | Type B 24.0 | Disp. 17 0.96 | THF MEK | 7.14 7.14 | 0.76 | 60 |
| 43 | Type B 20.0 | Disp. 17 0.4 | THF MEK | 9.4 9.4 | 0.76 | 60 |
| 44 | Type B 20.0 | Disp. 17 0.8 | THF Tol | 13.83 4.61 | 0.76 | 60 |
| 45 | Type B 20.0 | Disp. 17 0.8 | THF MIBK Tol | 6.15 6.15 6.15 | 0.76 | 60 |
| 46 | Type B 20.0 | Disp. 17 0.8 | CH THF | 12.91 5.53 | 0.76 | 60 |
| 47 | Type B 20.0 | Disp. 17 0.8 | EOEA THF | 12.91 5.53 | 0.76 | 60 |
| 48 | Type B 20.0 | Disp. 17 0.8 | BA THF | 12.91 5.53 | 0.76 | 60 |
| 49 | Type B 20.0 | Disp. 17 0.8 | BOEA THF | 12.91 5.53 | 0.76 | 60 |
| 50 | Type B 20.0 | Disp. 17 0.8 | EA THF | 9.2 9.2 | 0.76 | 60 |
| 51 | Type A 20.0 | Disp. 17 0.8 | THF MEK | 9.2 9.2 | 0.76 | 60 |
| CE 6 | Type A 20.0 | Lecithin 0.8 | THF MEK | 9.2 9.2 | 0.76 | 60 |
| 52 | Type D 20.0 | Disp. 17 0.8 | THF MEK | 9.2 9.2 | 0.76 | 60 |
| CE 7 | Type D 20.0 | Lecithin 0.8 | THF MEK | 9.2 9.2 | 0.76 | 60 |
| 53 | Type C 20.0 | Disp. 17 0.8 | THF MEK | 9.2 9.2 | 0.76 | 60 |
| CE 8 | Type C 20.0 | Lecithin 0.8 | THF MEK | 9.2 9.2 | 0.76 | 60 |
| 54 | Type A 80.4 | Disp. 1 3.22 | THF MEK | 36.98 36.98 | 2.41 | 60 |
| CE 9 | Type A 80.4 | Lecithin 3.22 | THF MEK | 36.98 36.98 | 2.41 | 60 |
| 55 | Type A 80.4 | Disp. 1 6.41 | THF MEK | 35.38 35.38 | 2.41 | 45 |
| 56 | Type A 96.0 | Disp. 1 3.92 | THF MEK | 28.84 28.84 | 2.41 | 45 |
| 57 | Type A 64.0 | Disp. 1 2.56 | THF MEK | 45.52 45.52 | 2.41 | 45 |
| 58 | Type A 80.4 | Disp. 1 3.22 | THF MEK | 38.19 38.19 | — | 45 |
| 59 | Type A 80.0 | Disp. 2 3.20 | THF MEK | 37.20 37.20 | 2.41 | 45 |
| 60 | Type A 80.0 | Disp. 3 3.20 | THF MEK | 37.20 37.20 | 2.41 | 45 |

EXAMPLE 61

80 g of magnetic material type E, 3.2 g of Dispersant 17, 9.2 g of THF, 9.2 g of MEK and 0.76 g of UCAR VAGH resin were loaded into a conventional ball mill charged with 600 g of 7 mm steel balls. After 7 days of milling, a dispersion suitable for use in magnetic media manufacture was obtained.

Similar formulations in which Dispersant 17 was replaced by an equal weight of lecithin and an equal weight of GAFAC RE-610 solidified in the mill and failed to produce dispersions.

EXAMPLES 26A to 53A AND COMPARATIVE EXAMPLES 1A TO 8A

Dispersions prepared in Examples 26 to 53 and Comparative Examples 1 to 8 were let down with a 20% w/w solution of a polyurethane (PU) resin in tetrahydrofuran. Typically the let down was carried out in three stages with approximately equal quantities of polyurethane solution each time. The mixture was subjected to a 5 minute high-energy ball milling after each stage of the let down. The resultant lacquers were then further let down with solvent and the mixture subjected to a further 5 minutes high-energy ball milling. Table 4 identifies the dispersions, the weight of PU resin solution used in the let down and the weight of solvent used in the let down; unless otherwise indicate the let down solvent was a 1:1 mixture of tetrahydrofuran and methyl ethyl ketone. The PU resin used was obtained from B. F. Goodrich Inc. under the name ESTANE 5701-F1 (ESTANE is a trade mark).

TABLE 4

| Example or CE Number | Dispersion used | Amount of 20% PU resin solution (g) | Amount of solvent used (g) |
|---|---|---|---|
| 26A | Ex. 26 | 68.2 | 119.6 |
| CE 1A | CE 1 | 68.2 | 119.6 |
| 27A | Ex. 27 | 76 | 119.6 |
| CE 2A | CE 2 | 76 | 119.6 |
| CE 3A | CE 3 | 76 | 119.6 |
| CE 4A | CE 4 | 22 | 14.92 |
| 28A | Ex. 28 | 22 | 14.92 |
| CE 5A | CE 5 | 22 | 14.92 |
| 29A | Ex. 29 | 22 | 14.92 |
| 30A | Ex. 30 | 22 | 14.92 |
| 31A | Ex. 31 | 22 | 14.92 |
| 32A | Ex. 32 | 22 | 14.92 |
| 33A | Ex. 33 | 22 | 14.92 |
| 4A | Ex. 34 | 22 | 14.92 |
| 5A | Ex. 35 | 22 | 14.92 |
| 36A | Ex. 36 | 22 | 14.92 |
| 37A | Ex. 37 | 22 | 14.92 |
| 38A | Ex. 38 | 22 | 14.92 |
| 39A | Ex. 39 | 22 | 14.92 |
| 40A | Ex. 40 | 22 | 14.92 |
| 41A | Ex. 41 | 17.6 | 3.94 |
| 42A | Ex. 42 | 26.4 | 25.90 |
| 43A | Ex. 43 | 22 | 14.92 |
| 44A | Ex. 44 | 22 | THF 14.92 |
| 45A | Ex. 45 | 22 | THF 14.92 |
| 46A | Ex. 46 | 22 | THF 14.92 |
| 47A | Ex. 47 | 22 | THF 14.92 |
| 48A | Ex. 48 | 22 | THF 14.92 |
| 49A | Ex. 49 | 22 | THF 14.92 |
| 50A | Ex. 50 | 22 | THF 14.92 |
| 51A | Ex. 51 | 22 | 14.92 |
| CE 6A | CE 6 | 22 | 14.92 |
| 52A | Ex. 52 | 22 | 14.92 |
| CE 7A | CE 7 | 22 | 14.92 |
| 53A | Ex. 53 | 22 | 14.92 |
| CE 8A | CE 8 | 22 | 14.92 |

EXAMPLE 61A

Dispersion 61 was let-down with 40 g of 20% PU resin solution and milled for 1 hour, let-down with a further 48 g of 20% PU resin solution and milled for ½ hour, and then let-down with 50 g of a 1:1 mixture of THF and MEK and milled for ½ hour.

Magnetostatic Evaluations

The let down lacquers were discharged from the ball-mill and used to coat a roll of 12 micron thick biaxially-oriented polyester film. In the case of Examples 26A and 27A and Comparative Examples 1A to 3A the coating was carried out using a gravure coater. Immediately after coating and before any appreciable drying, the film was passed between like poles of two powerful magnets. The film was then dried by solvent evaporation prior to winding.

In the case of Examples 28A to 53A and 61A and Comparative Examples 4A to 8A the coating was carried out using a mechanised wire-wound K-bar (Meyer Bar) draw-down system. The K-bar was calibrated to leave a wet film of thickness 50 microns. The machine was modified so that a powerful permanent magnet mounted about 1.5 cm above the polyester film followed the motion of the K-bar. In this way a strong magnetic field passed across the wet film before any appreciable solvent evaporation had taken place. The film was then allowed to dry by solvent evaporation.

Samples of coated films were then evaluated by conventional techniques on a vibrating-sample magnetometer. The normal operating procedure with this equipment involved carry out measurements consecutively on a series of samples. In order to provide an internal control, and allow comparison between data relating to different series, a control was included in each series. This control was a Comparative Example containing the magnetic material under evaluation and Lecithin as the dispersant. Table 5 reports the magnetic parameters of coated films determined in ten series of consecutive measurements. The first sample in each series is the control.

The magnetic parameters determined were coercivity (in Oersteds), squareness (Br/Bs) and Magnetic Orientation Ratio (OR). Coercivity and squareness are parallel to the direction of travel of film through the magnets or of the magnet over the film.

TABLE 5

| Series Number | Example or CE Number | Coercivity (Oersteds) | Squareness (Br/Bs) | Orientation Ratio |
|---|---|---|---|---|
| 1 | CE 1A | 430 | 0.76 | 1.79 |
|   | Ex. 26A | 449 | 0.80 | 2.27 |
| 2 | CE 2A | 434 | 0.80 | 2.29 |
|   | CE 3A | 430 | 0.80 | 2.40 |
|   | Ex. 27A | 448 | 0.81 | 2.32 |
| 3 | CE 4A | 657 | 0.68 | 1.46 |
|   | CE 5A | 671 | 0.78 | 2.07 |
|   | Ex. 28A | 690 | 0.80 | 2.10 |
| 4 | CE 4A | 699 | 0.69 | 1.30 |
|   | Ex. 29A | 712 | 0.79 | 1.79 |
|   | Ex. 30A | 727 | 0.81 | 1.83 |
|   | Ex. 31A | 723 | 0.78 | 1.85 |
|   | Ex. 32A | 723 | 0.81 | 1.77 |
|   | Ex. 33A | 713 | 0.79 | 1.73 |
|   | Ex. 34A | 716 | 0.82 | 1.86 |
|   | Ex. 35A | 716 | 0.81 | 1.80 |
|   | Ex. 36A | 718 | 0.78 | 1.82 |
| 5 | CE 4A | 708 | 0.68 | 1.31 |
|   | Ex. 37A | 739 | 0.77 | 1.80 |
|   | Ex. 38A | 745 | 0.81 | 1.89 |
| 6 | CE 4A | 707 | 0.68 | 1.39 |
|   | Ex. 39A | 736 | 0.77 | 1.78 |
|   | Ex. 40A | 738 | 0.79 | 1.85 |
|   | Ex. 41A | 733 | 0.78 | 1.74 |
|   | Ex. 42A | 749 | 0.82 | 2.00 |
|   | Ex. 43A | 739 | 0.77 | 1.79 |
|   | Ex. 44A | 742 | 0.80 | 1.90 |
|   | Ex. 45A | 744 | 0.80 | 1.88 |
|   | Ex. 46A | 744 | 0.82 | 1.87 |
|   | Ex. 47A | 737 | 0.80 | 1.79 |
|   | Ex. 48A | 727 | 0.79 | 1.70 |
|   | Ex. 49A | 728 | 0.78 | 1.83 |
|   | Ex. 50A | 722 | 0.79 | 1.71 |
| 7 | CE 6A | 425 | 0.76 | 2.02 |
|   | Ex. 51A | 431 | 0.82 | 2.44 |
| 8 | CE 7A | 716 | 0.70 | 1.55 |
|   | Ex. 52A | 728 | 0.72 | 1.34 |
| 9 | CE 8A | 465 | 0.61 | 1.22 |
|   | Ex. 53A | 474 | 0.61 | 1.22 |
| 10* | Ex. 61A | 154 | 0.48 | 1.43 |

*No comparative example in this series because of the failure to produce a dispersion using lecithin.

We claim:

1. A dispersion of finely divided particles of a magnetic material in an organic liquid containing a dispersant comprising an amine carrying a poly(carbonylalkyleneoxy) chain in which the alkylene groups contain up to 8 carbon atoms, or a salt thereof with an acid.

2. A dispersion according to claim 1 wherein the alkylene groups in the poly(carbonylalkyleneoxy) chain contain from 3 to 6 carbon atoms.

3. A dispersion according to claim 1 wherein the amine conforms to the general formula:

$$X—Y—Z \qquad \qquad \text{I}$$

wherein

X is the poly(carbonylalkyleneoxy) chain;

Y is a bridging group; and

Z is an organic radical containing an amino group.

4. A dispersion according to claim 3 wherein the bridging group, Y, is selected from —CO—O— (ester), —CO—NR (amide) and —CO—O$^-$ $^+$NT$_3$ (salt) in which R is H or C$_{1-20}$-alkyl and T is H or an organic radical.

5. A dispersion according to claim 3 wherein the organic radical containing an amino group, Z, is of the formula:

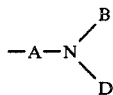

wherein

A is C$_{1-4}$-alkylene;

B is H or optionally substituted C$_{1-20}$-alkyl; and

D is optionally substituted C$_{1-20}$-alkyl.

6. A dispersion according to claim 5 wherein the B and/or D is polyethyleneimine having a molecular weight up to 600,000.

7. A dispersion according to claim 1 containing from 30% to 90% by weight of the magnetic material based upon the total weight of the dispersion and from 0.25% to 10% by weight on the dispersant based upon the weight of the magnetic material.

8. A magnetic recording medium comprising a substrate carrying a superficial layer of a film forming resin containing dispersed therein finely divided particles of a magnetic material and a dispersant as defined in claim 1.

9. A dispersant suitable for use in a dispersion according to claim 1 comprising a poly(ethyleneimine) carrying a poly(carbonylalkyleneoxy), chain attached thereto by an amide or salt bridging group as defined in claim 4, in which the alkyleneoxy group contains from 3 to 6 carbon atoms and the poly(carbonylalkyleneoxy) chain contains from 3 to 80 carbonylalkyleneoxy groups.

10. A dispersant suitable for use in a dispersion according to claim 1 comprising an acid salt of of an amine carrying a poly(carbonylalkyleneoxy) chain attached thereto by an ester, amide or salt bridging group as defined in claim 4, in which the alkyleneoxy group contains from 3 to 6 carbon atoms and the poly(carbonylalkyleneoxy) chain contains from 3 to 80 carbonylalkyleneoxy groups.

* * * * *